United States Patent [19]

Liebke et al.

[11] Patent Number: 5,702,288

[45] Date of Patent: Dec. 30, 1997

[54] METHOD OF REMOVING EXCESS OVERLAY COATING FROM WITHIN COOLING HOLES OF ALUMINIDE COATED GAS TURBINE ENGINE COMPONENTS

[75] Inventors: William R. Liebke, Vernon; David R. Dawson, East Hartford; Mark A. Fredette, Windsor; Mark B. Goodstein, Windsor Locks, all of Conn.

[73] Assignee: United Technologies Corporation, Hartford, Conn.

[21] Appl. No.: 521,199

[22] Filed: Aug. 30, 1995

[51] Int. Cl.$^6$ ............................................. B24B 1/00
[52] U.S. Cl. ............................ 451/36; 451/61; 451/113
[58] Field of Search ............................. 451/36, 61, 104, 451/113

[56] References Cited

U.S. PATENT DOCUMENTS

| | | | |
|---|---|---|---|
| 3,634,973 | 1/1972 | McCarty | 51/2 R |
| 3,699,725 | 10/1972 | Feldcamp | 451/36 |
| 3,802,128 | 4/1974 | Minear, Jr. et al. | 51/2 R |
| 3,819,343 | 6/1974 | Rhodes | 51/302 |
| 4,005,989 | 2/1977 | Preston | 29/194 |
| 4,317,685 | 3/1982 | Ahuja et al. | 134/2 |
| 4,449,023 | 5/1984 | Hilhorst et al. | 200/159 B |
| 4,677,035 | 6/1987 | Fiedler et al. | 428/680 |
| 4,897,315 | 1/1990 | Gupta | 428/552 |
| 4,933,815 | 6/1990 | Parthasarathy | 362/32 |
| 4,936,057 | 6/1990 | Rhodes | 51/317 |
| 4,995,949 | 2/1991 | Rhodes | 204/15 |
| 4,996,796 | 3/1991 | Rhodes | 51/26 |
| 5,050,119 | 9/1991 | Parthasarathy | 362/32 |
| 5,054,247 | 10/1991 | Rhodes et al. | 51/317 |
| 5,057,196 | 10/1991 | Creech et al. | 204/181.5 |
| 5,070,652 | 12/1991 | Rhodes et al. | 51/7 |
| 5,076,027 | 12/1991 | Rhodes | 51/318 |
| 5,088,047 | 2/1992 | Bynum | 364/474.24 |
| 5,090,870 | 2/1992 | Gilliam | 451/36 |
| 5,125,191 | 6/1992 | Rhodes | 51/317 |
| 5,235,959 | 8/1993 | Frank et al. | 451/36 |
| 5,341,602 | 8/1994 | Foley | 451/36 |
| 5,367,833 | 11/1994 | Rhodes et al. | 451/104 |
| 5,437,724 | 8/1995 | Dansereau et al. | 118/76 |
| 5,486,281 | 1/1996 | Gruver et al. | 205/110 |

OTHER PUBLICATIONS

L. J. Rhodes, "Abrasive Flow Machining", Manufacturing Engineering, Nov. 1988, pp. 75–78.

L. Rhodes, "Abrasive Flow Machining With Not–So–Silly Putty", Metal Finishing, Jul. 1987, pp. 27–29.

L. Rhodes, "Abrasive Flow Machining: A Case Study", Journal of Materials Processing Technology, 28 (1991) 107–116.

*Primary Examiner*—James G. Smith
*Assistant Examiner*—Dona C. Edwards
*Attorney, Agent, or Firm*—Brooks Haidt Haffner & Delahunty

[57] ABSTRACT

A method of removing excess MCrAlY overlay coating from within a cooling hole of an aluminide coated gas turbine engine component is disclosed. The method includes providing a gas turbine engine component having an internal surface (4), an outer surface (6) and a root end (8). The component also includes at least one cooling hole (10) extending from the internal surface (4) to the outer surface (6), wherein the internal surface (4) of the component is coated with a corrosion resistant aluminide coating. An MCrAlY overlay coating (12) is also located on the outer surface (6) and inside a portion of the cooling hole (10). An abrasive slurry is forced into the gas turbine engine component from the outside of the component to the inside of the component, through the cooling hole (10), such that the slurry flows through the internal surface (4) of the component and removes at least a portion of the overlay coating (12) located inside the cooling hole (10) without adversely affecting the internal surface (4) of the component. The abrasive slurry subsequently exits the component through the root end (8).

3 Claims, 1 Drawing Sheet

METHOD OF REMOVING EXCESS OVERLAY COATING FROM WITHIN COOLING HOLES OF ALUMINIDE COATED GAS TURBINE ENGINE COMPONENTS

BACKGROUND OF THE INVENTION

1. Technical Field

The present invention relates generally to a method of modifying cooling holes of internally coated gas turbine engine components. The present invention relates particularly to a method of removing excess overlay coating from within the cooling holes of aluminide coated gas turbine engine components without adversely affecting the internal aluminide coated surfaces of the components so that airflow through the components can be maintained within design limits.

2. Background Information

Gas turbine engines operate at extremely high temperatures for increased performance and efficiency. A limiting factor in most gas turbine engine designs, however, is the maximum temperature that can be tolerated at the gas turbine inlet. Accordingly, scientists and engineers are constantly seeking new and improved methods to increase the allowable gas turbine inlet temperature.

One such method to increase the allowable gas turbine inlet temperature and/or decrease airfoil metal temperature is to provide cooling holes on the component, such as at the leading and trailing edges of the inlet guide vanes of the first stage turbine and first stage rotor blades. Conventional techniques for producing these cooling holes include electrical discharge machining (EDM) and laser drilling.

During aircraft operation, compressor bleed air is directed through passages inside the engine to these cooling holes. The air passes through the internal passages of the blades and vanes and enters the cooling holes. The air then exits the cooling holes and flows over the airfoil surface, subsequently passing out of the engine with engine exhaust. As the air flows over the airfoil surface, it forms a cool layer which reduces the temperature of the surface and physically keeps the hot gases from contacting the airfoil surface, thereby permitting gases from the burner section to enter the turbine at a higher temperature than would otherwise be possible.

Due to this high operation temperature, it is necessary to protect the metallic internal and external surfaces of the airfoils from oxidation and corrosion. Aluminide coatings are well-known and widely used in the gas turbine industry to protect such metallic surfaces from oxidation and corrosion because they are economical and add little weight to the airfoil. Aluminide coatings are formed by diffusing aluminum into the surface of the metallic article to produce an aluminum-rich surface layer which is resistant to the above described adverse effects.

It is also common to apply a protective overlay coating, such as a MCrAlY coating, on the external surface of the airfoils to provide additional oxidation resistance/corrosion protection. MCrAlY refers to known metal coating systems in which M denotes nickel, cobalt, iron or mixtures thereof; Cr denotes chromium; Al denotes aluminum; and Y denotes yttrium. MCrAlY coatings are known as overlay coatings because they are put down in a predetermined composition and do not interact significantly with the substrate during the deposition process. This MCrAlY coating is applied, typically by a plasma spray technique, after production of the cooling holes. This inevitably results in an undesirable accumulation of the MCrAlY coating within the interior of the cooling holes, particularly near the external edge of the holes. This accumulation can lead to reduced airfoil cooling and result in undesirable hot spots on the airfoil. This is the case because even a small variation from cooling hole design limitations can result in a substantial variation in flow and/or flow resistance. For example, those of ordinary skill in the art recognize that cooling hole diameter affects airflow characteristics. More importantly, the overall efficiency of engine operation is directly related to how precisely the airflow can be metered or controlled.

Accordingly, compensation for cooling hole diameter reduction due to the anticipated build up of overlay coating in the holes is typically made when initially drilling the cooling holes. This is accomplished by determining the amount of overlay coating that will subsequently build up in the hole (based on past experience) and then drilling the hole in a larger diameter to compensate for this anticipated buildup. A variation in the compensation factor, however, can also result in cooling airflow through the holes which is outside the desired design limits. Thus, if a MCrAlY coated component is tested and found to have low airflow (i.e. airflow outside the calculated design limits) then the excess overlay build up in the cooling holes must be removed to bring the airflow within design limits or else the component must be scrapped. This excess overlay coating material is typically removed by pencil grit blasting which is a lengthy, manual process whereby each cooling hole is individually grit blasted to remove the excess overlay material. This technique effectively removes the excess overlay coating from the cooling holes. However, a significant problem is that the grit blasting often removes the desirable protective aluminide coating located on the internal surfaces of the components, thereby exposing the internal base metal component surfaces to the hot internal gases flowing them through. If this occurs, such components must either be scrapped or reworked.

Accordingly, there exists a need for a method of removing excess overlay coating from within the cooling holes of an aluminide coated gas turbine engine component without substantially damaging the internal surfaces of the component such that airflow through the component can be maintained within design limits.

DISCLOSURE OF THE INVENTION

This invention is predicated on the discovery that abrasive flow machining may be employed to remove excess overlay coating from within gas turbine engine component cooling holes without substantially damaging the internal surface of the component, particularly the aluminide coating located on the internal surface of the component. This is a significant improvement over the current state of the art which typically removes the excess overlay coating in the cooling holes by pencil grit blasting.

Accordingly, a method of removing excess MCrAlY overlay coating from within a cooling hole of an aluminide coated gas turbine engine component is disclosed. The method includes providing a gas turbine engine component having an internal surface, an outer surface and a root end. The component also includes at least one cooling hole extending from the internal surface to the outer surface, wherein the internal surface of the component is coated with a corrosion resistant aluminide coating. An MCrAlY overlay coating is also located on the outer surface and inside a portion of the cooling hole.

An abrasive slurry is forced into the gas turbine engine component from the outer surface (outside) of the component to the internal surface (inside) of the component, through the cooling hole, so that the slurry flows through the cooling hole and the internal surface of the component and removes at least a portion of the overlay coating located inside the cooling hole without substantially damaging/ adversely affecting the internal surfaces of the component. The abrasive slurry subsequently exits the component through the root end.

An advantage of the present invention is the ability to remove excess MCrAlY overlay coating from within gas turbine engine component cooling holes without attacking the corrosion resistant aluminide coating located on the internal surface of the component.

Another advantage of the present invention is that airflow through the components can be maintained within design limits.

Yet another advantage of the present invention is the avoidance of hot spots on the surfaces of the components.

BEST MODE FOR CARRYING OUT THE INVENTION

Figure 1:
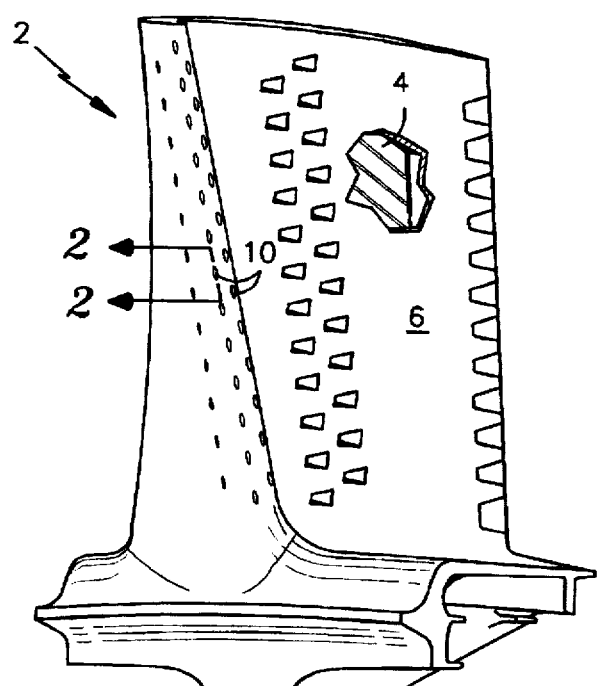
FIG. 1 shows a gas turbine engine blade.

As shown in FIG. 1, a gas turbine engine component such as a blade 2 includes an internal surface 4, an outer surface 6 and a root end 8. The blade 2 is typically made of a nickel base, iron base or cobalt base superalloy. Superalloys are materials specifically developed for high temperature operation. The blade 2 may be fabricated by conventional investment casting techniques.

The blade 2 also has a plurality of cooling holes 10 extending from the internal surface 4 to the outer surface 6. The cooling holes 10 are conventionally produced by methods such as electrical discharge machining (EDM) or preferably laser drilling. The diameter of the cooling holes is typically between about 0.010 inches (0.254 mm) and about 0.030 inches (0.762 mm).

After production of the cooling holes 10, the blade 2 is treated with coating to provide protection from the harsh operating environment, as well as to increase the service life of the blade 2. Typically, an aluminide diffusion coating is applied to the internal surface 4 of the blade 2, including inside cooling holes 10. The aluminide diffusion coating may also be applied to the outer surface 6 of blade 2, although this is less common. Aluminide coatings are well-known and widely used in the gas turbine industry to protect the base metal material from oxidation and corrosion because they are effective and add little weight to the blade 2. For example, the aluminide coating may be formed on blade 2 by diffusing aluminum into the surface of the blade 2 to produce an aluminum-rich surface layer which is resistant to oxidation and corrosion. More specifically, the aluminide coating is typically applied by a pack process employing a powder mixture including an inert ceramic material, an aluminum source and a halide activating compound. The powder materials are well mixed and the component to be coated is buried in the powder mix. During the aluminide coating process an inert or reducing gas is flowed through the pack and the pack is heated to an elevated temperature. The halide activator reacts with the aluminum source to produce an aluminum-halide compound vapor which contacts the surface of the blade 2. When the vapor contacts the blade surface, it decomposes, leaving the aluminum on the surface and releasing the halide to return to the aluminum source and continue the transport process. After the aluminum is deposited, it diffuses into the blade material thereby forming a thin, protective, adherent scale. Any nonadherent powder particles remaining within the cooling holes 10 are typically so negligible that airflow through the blade 2 is not detrimentally affected.

Figure 2:
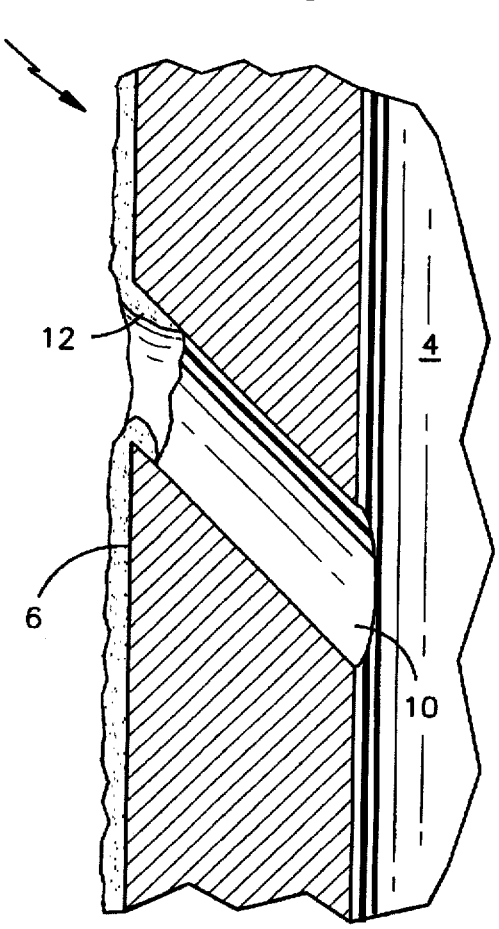
FIG. 2 shows a cross section of a gas turbine engine blade having a MCrAlY overlay coating located in a portion of a cooling hole.

After application of the aluminide coating, a protective overlay coating 12 is applied to the external surface of the blade 2 to provide additional oxidation resistance/corrosion protection (shown schematically in FIG. 2). This overlay coating 12 is typically of the MCrAlY type. MCrAlY refers to known metal coating systems in which M denotes nickel, cobalt, iron or mixtures thereof; Cr denotes chromium; Al denotes aluminum; and Y denotes yttrium. For examples of MCrAlY materials see U.S. Pat. No. 3,528,861 which describes a FeCrAlY coating as does U.S. Pat. No. 3,542,530. A preferred MCrAlY composition is described in U.S. Pat. No. Re. 32,121, which is assigned to the present Assignee and discloses a weight percent compositional range of 5–40 Cr, 8–35 Al, 0.1–2.0 Y, 0.1–7 Si, 0.1–2.0 Hf, balance selected from the group consisting of Ni, Co and mixtures thereof. Another example of a preferred MCrAlY composition is that disclosed in U.S. Pat. No. 4,585,481, which is also assigned the present Assignee. The above mentioned patents are herein incorporated by reference.

The overlay coating 12 may be applied by any method capable of producing a dense, uniform, adherent coating of desired composition. For example, techniques such as sputtering and electron beam physical vapor deposition are known. In addition, high velocity plasma spray is particularly useful for deposition of hafnium containing coatings. The thickness of the overlay coating 12 is typically between about 5 mils (0.127 mm) and about 10 mils (0.245 mm).

Application of the overlay coating 12 often results in an undesirable accumulation of this material within the cooling holes 10 (as shown in FIG. 2), even if the cooling holes 10 were initially drilled with a larger diameter to compensate for the anticipated buildup. This material may adversely affect airflow and result in local hot spots on the blade 2 and inefficient engine operation.

Accordingly, after application of the MCrAlY overlay coating 12 to the external surface of the blade 2, the blade 2 is loaded into an airflow fixture to determine the airflow through the blade 2. One of ordinary skill in the art would appreciate that a plurality of cooling holes 10 are typically located on blade 2 at various locations such as along the leading edge, trailing edge, or even down the midspan portion of the blade 2. Location of cooling holes 10 is dependent on factors such as engine type, blade 2 geometry and operating conditions. If a plurality of cooling holes 10 are located on the blade 2, it is common practice to mask (i.e. tape over) a portion of the cooling holes 10 and test airflow in a section by section fashion.

Testing is conventional. For example, one of ordinary skill in the art would appreciate that the airflow through the blade 2 is based in part on the barometric pressure of the day which dictates the pressure forced through the blade 2. A gauge on the airflow fixture reads the back pressure and the resultant value is compared against predetermined acceptable design ranges. These predetermined acceptable design ranges are calculated from a conventional computer program wherein variables such as barometric pressure, diameter of cooling hole and flow parameters are inserted into the program. Upon comparing the actual results to the design limits, the operator can determine if the cooling hole diameter is too small as a result of the excess overlay coating 12 within the cooling hole 10.

We have discovered that abrasive flow machining may be used to effectively remove at least a portion of the overlay coating 12 from within the cooling holes 10 without damaging the internal surface 4 of the blade 2, particularly the aluminide coating on the internal surface 4 of the blade 2. Abrasive flow machining commonly refers to a process which utilizes a semi-solid plastic medium having abrasive grits uniformly disposed there through. Typically this medium is extruded through or past a work piece surface to perform abrasive action, such as polishing, on the surface. A key feature of abrasive flow machining is that the process operates under considerable pressure and relatively low velocity. U.S. Pat. No. 5,125,191 describes abrasive flow machining in detail and is herein incorporated by reference.

We have discovered that an abrasive slurry may be forced into the blade 2 from the outside of the blade 2 to the inside of the blade 2, through the cooling holes 10, such that the abrasive slurry flows through the internal surface 4 of the blade 2 and removes at least a portion of the overlay coating 12 located inside the cooling holes 10 without removing the aluminide coating or otherwise damaging the internal surface 4 of the blade 2. As a result of this action, the abrasive slurry preferentially attacks the material in the cooling hole 10 near the outer surface 6, thereby reducing the thickness of the overlay coating 12 therein. Conversely, injecting the slurry from the inside of the blade 2 to the outside of the blade 2 will undesirably attack the internal surface 4 of the blade 2 near the cooling hole edge. The abrasive slurry and removed overlay coating 12 subsequently exit the blade 2 through the root end 8. The cycle may then be repeated.

The abrasive slurry used in the present invention is conventional and includes the mediums disclosed in U.S. Pat. No. 5,054,247 for abrasive action in abrasive flow machining. The contents of U.S. Pat. No. 5,054,247 are herein incorporated by reference. In general, the abrasive slurry for use in the present invention may be characterized as a semi-solid plastic flowable material having a plurality of abrasive grits uniformly disposed there through. A suitable semi-solid plastic flowable material is silicone putty, for example, in the grade indicated by General Electric Company as SS-91. The type and size of the abrasive grits disposed there through may vary depending on the size of the cooling holes 10. Suitable abrasive grit materials include, but are not limited to, aluminum oxide, silicon carbide, boron carbide, glass or fiber. One of ordinary skill in the art would recognize that small grit sizes (for example, less than about 4 mil (0.102 mm)) provide finer finishes and are more suitable for gas turbine engine cooling hole diameters which typically range between about 0.010 inches (0.254 mm) and about 0.030 inches (0.762 mm).

Specifically, we have used Extrude Hone Corporation media #831-G-1 for the abrasive slurry. Preferably, the abrasive grits per part of semi-solid plastic flowable material is about 20% by weight and the flow rate of the abrasive slurry is between about 0.300 lb/min and about 0.500 lb/min.

While we do not claim an abrasive flow machining device, such a device will be described herein to disclose a preferred mode of practicing our invention. For a more detailed description of abrasive flow machining devices, see U.S. Pat. No. 5,070,652, the contents of which are incorporated herein by reference. We have used abrasive flow machining device Vector Series Model by Extrude Hone Corporation, Irwin, Pa. This machine includes two abrasive slurry cylinders which close hydraulically during operation to hold a fixture in place. Preferably, the fixture is cylindrical and includes a plurality of blades 2 positioned within individual tooling/masking devices located in the fixture. The fixture should not provide a secondary leak path for abrasive slurry.

The tooling/masking devices hold the blades 2 in position and serve to direct the flow of abrasive slurry through particular cooling holes 10. For example, if the airflow through particular cooling holes 10 is within design limits (as determined by previous testing), then those holes 10 are covered or masked so that no abrasive slurry flows there through. The type of tooling/masking device is dependent on variables such has type of blade 2 and location of cooling holes 10. We have used a conventional ultraviolet curable polymer material to mask blades 2 without midspan cooling holes 10. The ultraviolet curable polymer material may be applied over particular cooling holes 10, such as those located on the leading edge of the blade 2. The blade 2 may then be exposed to ultraviolet light until the material is fully cured (e.g. no longer tacky). Such an adhesive material may be obtained from Dymax Corporation. For blades 2 having cooling holes 10 on the midspan section as well, we prefer to insert the blade 2 in a block type tooling device which is tailored for the fixture. This device has a plurality of openings therein to allow the abrasive slurry to flow into particular cooling holes 10. One of ordinary skill in the art would appreciate that there may be variety of suitable masking/tooling techniques for directing the abrasive slurry into particular cooling holes 10 and preventing flow through other cooling holes 10.

During operation, abrasive slurry is loaded into the bottom cylinder and forced up through the center of the bottom cylinder such that abrasive slurry overflow enters the internal surface 4 of the blade 2 via the cooling holes 10. As the abrasive slurry flows through the cooling holes 10, the abrasive action removes at least a portion of the overlay coating 12 located within the cooling holes 10 without adversely affecting internal surface 4 of the blade 2, particularly the aluminide coating located on the internal surface 4 of the blade 2. The flow through such narrow passages increases the local pressure and velocity to give preferential abrading of the overlay coating 12 in the cooling holes 10. The abrasive slurry then flows through the blade 2 and exits through the root end 8. Upon exiting the root end 8, the abrasive slurry returns to the bottom cylinder wherein the cycle is repeated until the appropriate cooling hole diameter is achieved. This is confirmed by subsequent, conventional airflow testing techniques.

The abrasive flow machining process is automated such that the mode of operation, for example flow pattern, is based on the machine settings, as well as other variable such as type of abrasive slurry. It is desirable that the abrasive slurry maintains a uniform flow rate as it moves through the cooling holes 10. One of ordinary skill in the art would appreciate that variables including but not limited to component geometry, type and size of abrasive slurry, and fixture design will also influence the machine settings.

Post processing steps may then be employed. For example, air pressure at about 80 psi (552 kPa) may be directed into the root end 8 of the blade 2 to force excess abrasive slurry out of the blade 2. The blade 2 may then be submerged in a cleansing bath to remove any external, excess undesirable material, such as abrasive slurry. For example, the blade 2 may be submerged in an alkali bath at about 160° F. (71° C.) for about 5 minutes and then rinsed with water for about 2 minutes. A conventional high pressure air gun may then be used to dry the blade 2. After drying, airflow through the blade 2 may be tested as previously described herein to ensure conformity with design limits.

In addition, if an ultraviolet curable material was employed, this material would be removed prior to submerging the blade 2 in the cleansing bath. For example, the material may be baked off by inserting the blade 2 in a furnace at above about 1000° F. (538° C.) for about 20 minutes.

The invention will now be described by example which is meant to be exemplary rather than limiting.

EXAMPLE

A protective MCrAlY overlay coating, as described in U.S. Pat. Re. 32,121, was conventionally applied to ten JT9D-7Q series first stage High Pressure Turbine (HPT) blades having an aluminide coating on their internal surface. The JT9D-7Q is a high bypass ratio engine capable of generating 53,000 pounds of thrust. Its first stage HPT blade is made from a directionally solidified alloy and is cooled by directing compressor bleed air through passages inside the engine to cooling holes at the blade leading edge and on its concave wall. Upon exiting these holes, the air forms a protective film on the external wall to keep the blade sufficiently cool. In order to adequately cool the blade and balance the cooling flow delivery system, flow through these holes must be maintained at +/−12.5 percent of a target nominal airflow level.

The ten blades were airflow tested following initial deposition of the MCrAlY coating. Airflow through all of the leading edge cooling hole groups flowed under minimum design tolerance acceptable for engine operation. This suggested that build-up of MCrAlY overlay coating in the cooling holes near the outer edge of the cooling holes had decreased the diameter of the cooling holes. Specifically, airflow ranged from 13% to 48% below design target nominal airflow level (minimum acceptable flow is 12.5% below design target nominal airflow level). Hole diameters were found to be up to 0.002 inches (0.051 mm) below target when conventionally checked with pin gauges.

The blades were then processed with use of a Vector Series abrasive flow machining device produced by Extrude Hone Corporation. Specifically, five of the ten blades were loaded into a cylindrical fixture on the device. The leading edge and concave wall flow groups were processed separately. This was possible by applying masking tooling to the fixture to block the flow of abrasive slurry through cooling holes in the flow group not being processed. Specifically, each blade was inserted into a block type tooling device, tailored for the fixture, having openings therein. The tooling device allowed abrasive slurry to flow through particular cooling holes.

Extrude Hone media #831-G-1 was forced through a 10 inch (0.254 m) media cylinder at pressure of about 475 psi (3275 kPa) in the bottom cylinder and about 575 psi (3964 kPa) in the top cylinder, with a displacement of 500 cubic inches per stroke (0.008 cubic meters per stroke). The media entered the internal surfaces of the blades via the cooling holes and exited the blades through the root end. The blades were processed through five cycles. The second group of five blades were processed through ten cycles.

The ten blades process in the trial were subsequently airflow tested. Application of the abrasive slurry process for five cycles in the leading edge of the first group of five blades resulted in an average airflow increase of 16%. Three of the five blades were still slightly under minimum flow after five slurry cycles.

Average airflow of the leading edge flow group of the second group of five blades processed through ten cycles increased by 25%. The airflow for each of these five blades fell within design tolerance after processing, and hole diameters were increased by up to about 0.002 inches (0.051 mm). Average airflow increase on the concave wall flow group was comparable to that of the leading edge. In addition, aluminide coating inside the hole and internal passages was not significantly affected by this processing. Based on these trials it was concluded that the process should be qualified for repair of JT9D-7Q HPT first stage turbine blades, with processing limited to about 10 ten cycles.

An advantage of the present invention is that it also has application in the repair of gas turbine engine components. For example, after a full engine run which is typically between about 2,000 hours and about 20,000 hours, gas turbine engine components are processed in a serviceability check. In this serviceability check, the component is inspected for adverse effects such as cracks, burned areas, and any dimensional deformities as a result of the harsh operating conditions of actual service. The component is then heat treated for stress relief. After this heat treatment, existing openings in the component, such as cooling holes, are masked (i.e. covered) and the external MCrAlY overlay coating is removed. Typically, this is accomplished by submersing the component in an acid bath.

All masking and any underlying MCrAlY coating is removed and the exposed, external base metal surface is then inspected for cracks. Provided the base metal is not defective, the external surface of the component may be recoated with a MCrAlY coating, as previously described. As a result of this recoating, however, an additional build up of excess MCrAlY coating accumulates in the cooling holes, thereby potentially adversely affecting airflow even more. Thus, the present invention has great utility in the subsequent repair of gas turbine engine components, as well as in the initial manufacture of such components.

Although the invention has been shown and described with respect to detailed embodiments thereof, it should be understood by those skilled in the art that various changes in form and detail may be made without departing from the spirit and scope of the invention. Specifically, although the invention has been primarily described with respect to a gas turbine engine blade, it should be understood that the invention is applicable to other gas turbine engine components such as vanes.

What is claimed is:

1. A gas turbine engine component repaired by providing a gas turbine engine component having an internal surface, an outer surface and a root end, the component also having at least one cooling hole extending from the internal surface to the outer surface, wherein the internal surface of the component is coated with an aluminide coating, the component further including a MCrAlY overlay coating on the outer surface and inside a portion of the cooling hole; and forcing an abrasive slurry of semi-solid plastic flowable material comprising abrasive grits into the gas turbine engine component from the outer surface of the component to the internal surface of the component, through the cooling hole, wherein the slurry flows through the cooling hole and removes at least a portion of the overlay coating located inside the cooling hole without adversely affecting the aluminide coating on the internal surface of the component such that airflow through the component is within +/−12.5 percent of a target nominal airflow level, the slurry subsequently, exiting the repaired component through the root end.

2. A method of repairing a gas turbine engine component by removing excess MCrAlY overlay coating from within a cooling hole of an aluminide coated gas turbine engine component comprising the steps of:

providing a gas turbine engine component having an internal surface, an outer surface and a root end, the component also having a plurality of cooling holes extending from the internal surface to the outer surface, wherein the internal surface of the component is coated with an aluminide coating, the component further including a MCrAlY overlay coating on the outer surface and inside a portion of the cooling holes;

masking a portion of the cooling holes to prevent flow there through;

inserting the component into an abrasive flow machining device; and forcing an abrasive slurry into the gas turbine engine component from the outer surface of the component to the internal surface of the component, through the cooling holes, wherein the slurry flows through the cooling holes and removes at least a portion of the overlay coating located inside the cooling holes without adversely affecting the aluminide coating on the internal surface of the component, such that airflow through the component is within design limits, +/−12.5 percent of a target nominal airflow level, the slurry subsequently exiting the repaired component through the root end.

3. The method of claim 2 wherein the masking step includes applying an ultraviolet curable polymer over the cooling holes.

* * * * *